G. T. REA.
INSECT TRAP.
APPLICATION FILED NOV. 1, 1910.
993,547.
Patented May 30, 1911.
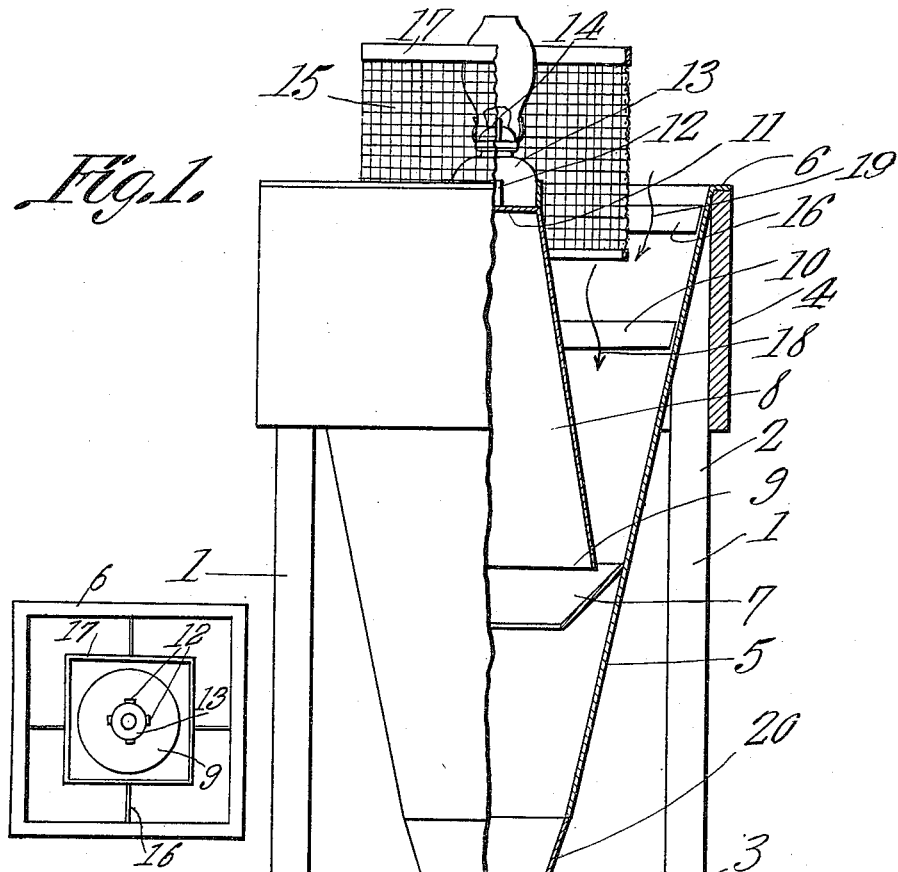
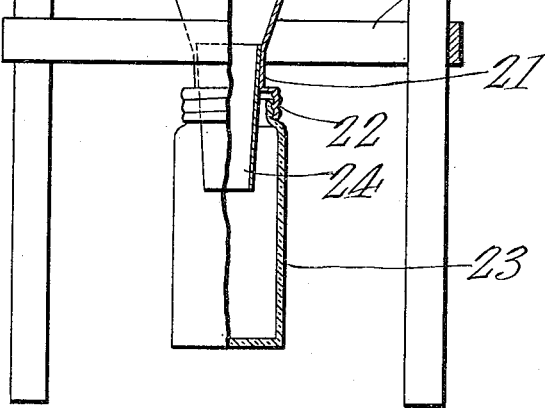
Witnesses
George T. Rea,
Inventor
by C. A. Snow & Co.
Attorneys

UNITED STATES PATENT OFFICE.

GEORGE THOMAS REA, OF ALICE, TEXAS, ASSIGNOR OF ONE-HALF TO AIKEN SPALDING, OF ALICE, TEXAS.

INSECT-TRAP.

993,547.

Specification of Letters Patent.   Patented May 30, 1911.

Application filed November 1, 1910. Serial No. 590,119.

*To all whom it may concern:*

Be it known that I, GEORGE T. REA, a citizen of the United States, residing at Alice, in the county of Nueces and State of Texas, have invented a new and useful Insect-Trap, of which the following is a specification.

This invention relates to traps, and particularly to insect traps, adapted for catching various objectionable bugs and the like, such as the species that feed upon cotton plants and the like, or upon various crops, portions of which extend above the level of the ground, or trees, bushes and the like.

The invention aims as its primary object to provide an insect trap, in which there is involved novel features of construction, and furthermore to produce a trap comprising a rectangular upstanding structure, having a conical chute including an annular flange upon its interior, and midway between the upper and lower ends thereof, in combination with an inverted cone shaped member upon which a lamp is supported.

As shown in the drawings it will be observed that the conical chute is arranged in and supported by the rectangular structure, and at its lower end is placed a jar or other receptacle, into which the bugs fall, after being attracted to the trap by the light upon the upper portion of the cone member. When the bugs fall through the chute down almost to the receptacle, and then endeavor to get back, they invariably will fly up into the interior of the inverted cone shaped member. If they are not successful in getting out of the trap, they will finally fall from exhaustion into the receptacle. It has been found by experimenting that there are very few bugs lost when the trap is set.

The invention comprises further features and combination of parts, which will be hereinafter more fully set forth, shown in the drawings and claimed.

In said drawings—Figure 1 is a side elevation of this improved trap partly broken away, and Fig. 2 is a plan view thereof.

Referring to these views by reference numerals, 1 denotes a vertically arranged skeleton structure, which comprises the corner posts 2, the lower braces 3, and the upper braces 4. Arranged in and supported by this rectangular structure is a conical shaped chute 5, the upper edge of which is formed into an annular flange 6, which is secured to the upper edge of the upper brace 4, as shown in the drawings. This chute midway between its upper and lower portions is formed with a flange 7, which constitutes means for making it difficult for the bugs, after once having passed the flange from getting out of the trap.

An inverted cone shaped member 8 is provided, which is arranged within the chute, with its larger end 9 slightly within the larger diameter of the said flange 7, in order to further prevent the bugs from ever getting out of the trap. It will be observed that the larger end 9 of the cone shaped member is considerably larger in diameter than the lower and smaller end of the flange 7. This inverted cone shaped member is supported inside of the conical chute by means of the arms 10, and its upper and smaller end 11 is provided with the lugs or projections 12, there being four of them, practically illustrated in the drawings, between which the bowl 13 of the lamp 14 is arranged. By the lugs 12 the lamp 14 is prevented from displacement. Surrounding the lamp is a rectangular frame of mesh work or screening 15, which is supported within and relatively with regard to the conical shaped chute, by means of the arms or supports 16. However, there is only one support 16 shown, for the reason that the others are hidden behind the other portions of the structure. There is only one arm 10 shown, while the others are also hidden, as is the case with regard to the arms 16. The upper edge of the rectangular mesh-work or screening is provided with an annular rim 17, in order to hold the mesh-work or screening properly in shape.

In the use of this improved lamp, the insects and bugs are attracted by the light of the lamp and fly toward it. If they come down from above they may enter the open upper end of the screening 15 through its rim 17, and whether they are burned by the lamp or not they will eventually fall out the bottom of the screening and take the course through the conical chute 5 that is indicated by the arrow 18. If they fly on a horizontal line toward this trap they will strike the outside of the screening 15, and after struggling to get through the same the larger insects will fall along the course indicated by the arrow 19 while the smaller ones may succeed in getting through the screening and will then take the course indicated by the arrow 18.

The lower end of the conical chute is formed with a supplemental conical shaped portion 20, which merges into a substantially cylindrical portion 21. This portion 21 merges into an enlarged annular flange 22, which is formed into suitable threads, as shown in the drawings. These threads are of the usual structure, and are similar to the threads of the closures of fruit jars and the like. Threaded to this flange is the jar 23, into which the bugs and the like fall. The cylindrical portion 21 of the chute has arranged therein, either by frictional contact, or by soldering or brazing, a slight conical shaped member 24. This conical shaped member 24 acts as a kind of a guide to more successfully direct the bugs into the jar.

The above set forth description in conjunction wth the annexed drawing discloses the fact that a novel form of insect trap is provided, and one which will successfully attract a number of insects that cannot escape being caught, after once having entered the chute below the flange 7. Furthermore, it will be observed that this form of trap may be manufactured very reasonably and will fulfil all the necessary requirements of farmers and the like.

The invention having been set forth, what is claimed as new and useful is:—

1. In an insect trap, a vertically arranged rectangular frame, a conical shaped chute arranged centrally in and supported by the frame, and including upon its interior an annularly arranged member, an inverted cone-shaped hood including means for holding a lamp upon its smaller end, and having its larger end arranged within the diameter of said annular member, said chute including at its lower end a receptacle threaded thereto, adapted to receive the bugs and the like.

2. In an insect trap, a vertically arranged rectangular frame; a conical shaped chute arranged centrally therein and supported thereby, and having upon its interior an annular flange arranged at an angle to the chute; a cone shaped member arranged within the chute above the flange with its larger end within the larger diameter of the said flange, and with its smaller diameter disposed upwardly, said cone shaped member having its smaller diameter provided with lugs or arms, there being four in number arranged annularly about said lower end; a lamp arranged between the lugs and supported upon said smaller end of the cone shaped member; a rectangular screening or mesh-work arranged around about the lamp, and means for supporting the screening or mesh-work with regard to the conical shaped chute; and a receptacle secured to the lower end of the chute.

3. In an insect trap, a vertically arranged rectangular frame, a conical shaped chute arranged centrally in and supported by the frame, and including upon its interior an annularly arranged member, an inverted cone-shaped hood including means for holding a lamp upon its smaller end, and having its larger end arranged within the diameter of said annular member, said chute including at its lower end a receptacle threaded thereto, adapted to receive the bugs and the like; and a rectangular screening or mesh-work arranged within the larger end of said conical chute, and arms extending radially from the inner wall of said larger portion of the conical chute for supporting the rectangular screening or mesh-work.

In testimony that I claim the foregoing as my own, I have hereto affixed my signature in the presence of two witnesses.

GEORGE THOMAS REA.

Witnesses:
Tom Graham,
T. J. Hinnant.

Copies of this patent may be obtained for five cents each, by addressing the " Commissioner of Patents. Washington, D. C."

It is hereby certified that in Letters Patent No. 993,547, granted May 30, 1911, upon the application of George Thomas Rea, of Alice, Texas, for an improvement in "Insect-Traps," an error appears requiring correction as follows: In the grant and in the heading of the printed specification it is stated that said Rea assigned "one-half" of his right to Aiken Spalding, whereas it should have been stated that said Rea *assigned one-fourth of his right to said Aiken Spalding*, as shown by the records of assignments in this office; and that the said Letters Patent should be read with this correction therein that the same may conform to the record of the case in the Patent Office.

Signed and sealed this 25th day of July, A. D., 1911.

[SEAL.]

E. B. MOORE,
*Commissioner of Patents.*